US012619079B2

(12) United States Patent
Zhao et al.

(10) Patent No.: US 12,619,079 B2
(45) Date of Patent: May 5, 2026

(54) DIFFRACTION OPTICAL WAVEGUIDE, DESIGN METHOD THEREOF AND NEAR-EYE DISPLAY DEVICE

(71) Applicant: JIAXING UPHOTON OPTOELECTRONICS TECHNOLOGY CO., LTD., Jiaxing (CN)

(72) Inventors: Xingming Zhao, Jiaxing (CN); Zhentao Fan, Jiaxing (CN); Kehan Tian, Jiaxing (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 355 days.

(21) Appl. No.: 18/462,147

(22) Filed: Sep. 6, 2023

(65) Prior Publication Data

US 2024/0134203 A1    Apr. 25, 2024
US 2024/0231104 A9    Jul. 11, 2024

(30) Foreign Application Priority Data

Oct. 19, 2022    (CN) .......................... 202211278492.1

(51) Int. Cl.
G02B 27/01        (2006.01)
F21V 8/00        (2006.01)
(Continued)

(52) U.S. Cl.
CPC ....... G02B 27/0172 (2013.01); G02B 6/0016 (2013.01); G02B 6/34 (2013.01); (Continued)

(58) Field of Classification Search
CPC .... G02B 6/0016; G02B 6/34; G02B 27/0012; G02B 27/0101; G02B 27/0172
See application file for complete search history.

(56) References Cited

U.S. PATENT DOCUMENTS 10,877,214 B2 * 12/2020 Shipton .............. G02B 27/1006
11,079,603 B2 * 8/2021 Cheng ................ G02B 27/0944
(Continued)

FOREIGN PATENT DOCUMENTS

CN        106647093 A  * 5/2017  ........... G09G 3/3607
CN        110596807 A  * 12/2019  ........... G02B 6/0078
(Continued)

OTHER PUBLICATIONS

English Translation for CN 113433613 A, 12 pages (Year: 2021).*
English Translation for CN 115166895 A, 17 pages (Year: 2022).*

*Primary Examiner* — Daniel Petkovsek
(74) *Attorney, Agent, or Firm* — INNOVATION CAPITAL LAW GROUP, LLP; Vic Lin

(57)        ABSTRACT

The disclosure provides a diffraction optical waveguide, a design method thereof and a near-eye display device. The diffraction optical waveguide includes: a waveguide substrate; a coupling-in grating configured to couple image light into the waveguide substrate through diffraction; and a coupling-out grating configured to couple at least a part of diffracted light propagating thereinto out of the waveguide substrate through diffraction, wherein the waveguide substrate includes M layers of waveguide media, a catadioptric interface is formed between adjacent waveguide media, the diffracted light passes through the M layers of waveguide media in sequence and is split by the catadioptric interface, beams after light splitting propagate towards a coupling-out zone along different transmission paths in the M layers of waveguide media, each layer of waveguide medium has a
(Continued)

100 different refractive index, a refractive index of an $i^{th}$ layer of waveguide medium being $n_i$, an air refractive index being $n_0$, and $|n_i - n_{i-1}| \geq 0.05$.

18 Claims, 5 Drawing Sheets

(51) Int. Cl.
  *G02B 6/34* (2006.01)
  *G02B 27/00* (2006.01)
(52) U.S. Cl.
  CPC ..... *G02B 27/0012* (2013.01); *G02B 27/0081* (2013.01); *G02B 27/0101* (2013.01)

(56) References Cited

U.S. PATENT DOCUMENTS

2015/0016777 A1* 1/2015 Abovitz ............. G02B 27/0093
                                                          385/37
2020/0409156 A1* 12/2020 Sissom .................. G02B 6/005

FOREIGN PATENT DOCUMENTS

| | | |
|---|---|---|
| CN | 110651211 A | 1/2020 |
| CN | 112041716 A | 12/2020 |
| CN | 112904482 A | 6/2021 |
| CN | 113433613 A | 9/2021 |
| CN | 115166895 A | 10/2022 |

* cited by examiner

100

100 n1 > n2 > n3 > n4

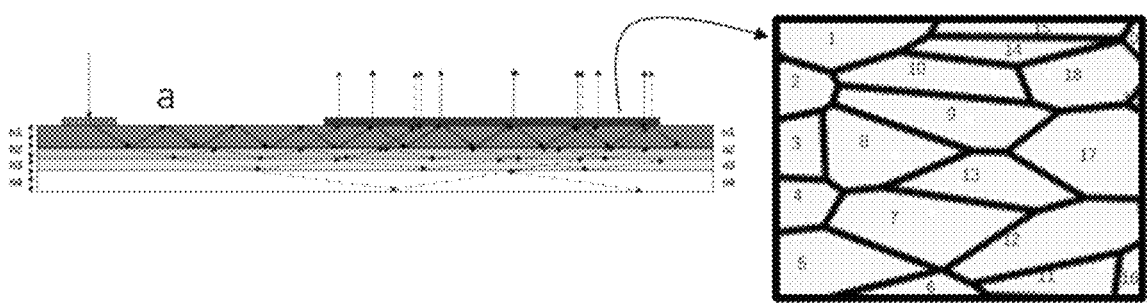

S11: Setting one or more of the following in the diffraction optical waveguide: the number M of layers of waveguide media, a refractive index of an $i^{th}$ layer of waveguide medium, a thickness of the $i^{th}$ layer of waveguide medium, the number of partition gratings in the coupling-out grating, structural depths of the partition gratings and structural types of the partition gratings S12: Obtaining, through simulation, coupling-out efficiency and uniformity of the diffraction optical waveguide

FIG. 7

DIFFRACTION OPTICAL WAVEGUIDE, DESIGN METHOD THEREOF AND NEAR-EYE DISPLAY DEVICE

TECHNICAL FIELD

The disclosure relates to the technical field of diffraction optics, and, in particular, to a diffraction optical waveguide, a near-eye display device and a design method of a diffraction optical waveguide.

BACKGROUND

With the development of the semiconductor technology, the way of human-computer interaction is making rapid progress. Augmented Reality (AR) can provide humans with more dimensional information. AR glasses are one of important media in the Augmented Reality field. An optical waveguide is a device capable of binding a light beam inside the same and transmitting an optical signal in a certain direction, which may serve as a front end of AR glasses. The optical waveguide transmits light carrying virtual information to human eyes to form an image on the retina. Furthermore, due to the good light transmittance of the optical waveguide, human eyes can also capture an image of a real environment, and a virtual image is finally integrated with the image of the real-environment to achieve the purpose of Augmented Reality.

When light propagates within an optical waveguide, the light is diffracted by a coupling-out grating to be output and is split into beams, which causes fast attenuation of the light energy. Although the diffraction efficiencies of the grating at different positions can be modulated by partition so as to regulate the uniformity of waveguide coupling-out, the modulation for the uniformity of the waveguide coupling-out is limited due to the degree of freedom of the grating per se.

The existing waveguides mostly employ partition gratings to modulate the uniformity of the waveguide coupling-out, thereby reducing the grating efficiency of a coupling-out end while improving the uniformity.

The contents in the Background are only the technologies known by the inventor, and do not necessarily represent the existing technology in the field.

SUMMARY

In view of one or more defects in the existing technology, the disclosure provides a diffraction optical waveguide, including:

a waveguide substrate including a coupling-in zone and a coupling-out zone, the coupling-in zone spaced apart from the coupling-out zone by a preset distance;

a coupling-in grating disposed in the coupling-in zone of the waveguide substrate and configured to couple image light into the waveguide substrate through diffraction; and a coupling-out grating disposed in the coupling-out zone of the waveguide substrate and configured to couple at least a part of diffracted light propagating thereinto out of the waveguide substrate through diffraction, wherein the waveguide substrate includes M layers of waveguide media, where M≥2, the refractive indexes of the M layers of waveguide media are configured with a non-sequential distribution, a catadioptric interface is formed between adjacent waveguide media, the diffracted light coupled-in from the coupling-in zone passes through the M layers of waveguide media in sequence and is split by the catadioptric interface, beams after light splitting propagate towards the coupling-out zone along different transmission paths in the M layers of waveguide media, and each layer of waveguide medium has a different refractive index, wherein a refractive index of an $i^{th}$ layer of waveguide medium is $n_i$, an air refractive index is $n_0$, and $|n_i-n_{i-1}|≥0.05$, such that the diffracted light coupled out of the waveguide substrate has a preset energy distribution.

According to one aspect of the disclosure, the $i^{th}$ layer of waveguide medium has a thickness of $h_i$, $h_i≤1$ mm.

According to one aspect of the disclosure, $|h_i-h_{i-1}|≥0.05$ mm.

According to one aspect of the disclosure, the coupling-in zone and the coupling-out zone are located at a surface of the waveguide substrate.

According to one aspect of the disclosure, the image light is diffracted by the coupling-in grating, and a propagation direction of the diffracted light in a first layer of waveguide medium satisfies the following formulae:

$$n_1 \sin \theta_1 \sin\varphi_1 = n_0 \sin \theta_0 \sin\varphi_0$$

$$n_1 \sin \theta_1 \cos\varphi_1 - n_0 \sin \theta_0 \cos\varphi_0 = \frac{\lambda}{d}$$

where $\lambda$ is a wavelength of the image light, d is a period of the coupling-in grating, $\theta_0$ is an incident angle when the image light is incident to the coupling-in grating, $\varphi_0$ is an azimuthal angle when the image light is incident to the coupling-in grating, $\theta_1$ is a diffraction angle of +1-order diffracted light in the first layer of waveguide medium, and $\varphi_1$ is an azimuthal angle of the +1-order diffracted light in the first layer of waveguide medium.

According to one aspect of the disclosure, the image light is diffracted by the coupling-in grating, the diffracted light is reflected and/or refracted by the catadioptric layer, and a light propagation direction satisfies:

$$n_i \sin \theta_i = n_0 \sin \theta_{i-1} \ (i≥2)$$

when the diffracted light propagates in the $i^{th}$ layer of waveguide medium, a gap $L_i$ between adjacent reflection positions satisfies the following formula:

$$L_i = 2h_i \tan \theta_i$$

where $h_i$ is a thickness of the $i^{th}$ layer of waveguide medium, and $\theta_i$ is an angle of the +1-order diffracted light in the $i^{th}$ layer of waveguide medium.

According to one aspect of the disclosure, the coupling-in grating is a circular grating, and has a coupling-in diameter of m, m≤5 mm.

According to one aspect of the disclosure, the coupling-out grating includes a plurality of partition gratings, and adjustment is made to one or more of the following: the number of partition gratings, structural depths of the partition gratings, structural types of the partition gratings, and the refractive index and thickness of the $i^{th}$ layer of waveguide medium, so as to improve coupling-out efficiency and/or uniformity of the diffraction optical waveguide.

According to one aspect of the disclosure, the coupling-in grating and the coupling-out grating are surface relief gratings or volume hologram gratings.

According to one aspect of the disclosure, the M layers of waveguide media are integrally formed by means of bonding.

The disclosure further provides a near-eye display device, including:

an optical machine configured to output image light; and a diffraction optical waveguide as described above, including a coupling-in grating and a coupling-out grating, the image light output by the optical machine entering the diffraction optical waveguide via the coupling-in grating, split into a plurality of beams in the diffraction optical waveguide and coupled out via the coupling-out grating along different transmission paths.

According to one aspect of the disclosure, the near-eye display device is an Augmented Reality display device or a Virtual Reality display device.

The disclosure further provides a design method of a diffraction optical waveguide as described above, including:

S11: setting one or more of the following in the diffraction optical waveguide: the number M of layers of waveguide media, a refractive index $n_i$ of an $i^{th}$ layer of waveguide medium, a thickness $h_i$ of the $i^{th}$ layer of waveguide medium, the number of partition gratings in the coupling-out grating, structural depths of the partition gratings and structural types of the partition gratings;

S12: obtaining, through simulation, coupling-out efficiency and uniformity of the diffraction optical waveguide.

According to the disclosure, a waveguide macrostructure, i.e., a layered waveguide with a variable refractive index, is combined with a grating microstructure, i.e., a partitioned coupling-out grating, so as to have better efficiency as compared with the existing waveguides, a higher degree of freedom in regulation of the waveguide uniformity, and a simple preparation process.

BRIEF DESCRIPTION OF THE DRAWINGS

The drawings that constitute a part of the disclosure are used to provide a further understanding of the disclosure, and the illustrative embodiments of the present disclosure and the descriptions thereof are used to explain the present disclosure, but do not constitute any limitation to the disclosure. In the drawings:

FIGS. 6A and 6B illustrate schematic diagrams of another diffraction optical waveguide structure and a full-field simulation result where the invention is adopted;

FIG. 7 illustrates a flowchart of a design method according to one embodiment of the disclosure;

DETAILED DESCRIPTION

Figure 1A:
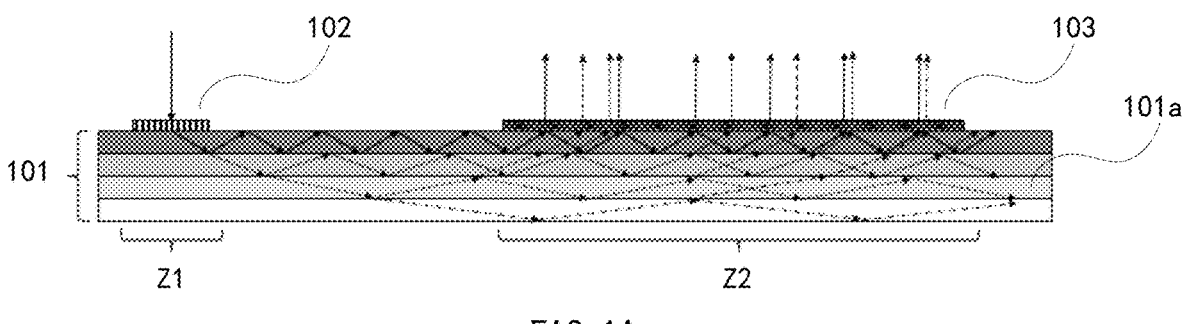
FIGS. 1A and 1B illustrate structural schematic diagrams of a diffraction optical waveguide according to one embodiment of the disclosure.

Only certain exemplary embodiments will be briefly described below. As those skilled in the art will recognize, the described embodiments may be modified in various different ways without departing from the spirit or scope of the present disclosure. Therefore, the drawings and the following description are deemed essentially exemplary, and not limitative.

In the description of the present disclosure, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position relations as shown in the accompanying drawings, and are used only for the purpose of facilitating description of the present disclosure and simplification of the description, instead of indicating or suggesting that the denoted devices or elements must be oriented specifically, or configured or operated in a specific orientation. Thus, such terms should not be construed to limit the present disclosure. In addition, such terms as "first" and "second" are only used for the purpose of description, rather than indicating or suggesting relative importance or implicitly indicating the number of the denoted technical features. Accordingly, features defined with "first" and "second" may, expressly or implicitly, include one or more of the features. In the description of the present disclosure, "plurality" means two or more, unless otherwise defined explicitly and specifically.

In the description of the present disclosure, it needs to be noted that, unless otherwise specified and defined explicitly, such terms as "installation" "coupling" and "connection" should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this may cover direct contact between the first and second features, or contact via another feature therebetween, other than the direct contact. Furthermore, if a first feature is "on", "above", or "over" a second feature, this may cover the case that the first feature is right above or obliquely above the second feature, or just indicate that the level of the first feature is higher than that of the second feature. If a first feature is "beneath", "below", or "under" a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit the present disclosure. Besides, the present disclosure may repeat a reference number and/or reference letter in different examples, and such repeat is for the purpose of simplification and clarity, which does not represent any relation among various embodiments and/or arrangements as discussed. In addition, the present disclosure provides examples of various specific processes and materials, but those skilled in the art can also be aware of application of other processes and/or use of other materials.

According to the disclosure, a waveguide macrostructure, i.e., a layered waveguide with a variable refractive index, is combined with a grating microstructure, i.e., a partitioned coupling-out grating, so as to have better efficiency as compared with the existing waveguides, a higher degree of freedom in regulation of the waveguide uniformity, and a simple preparation process.

The preferred embodiments of the present disclosure will be described below with reference to the drawings. It should be appreciated that the preferred embodiments described herein are only used to illustrate and explain the present disclosure, but not to limit the present disclosure.

FIG. 1A illustrates a structural schematic diagram of a diffraction optical waveguide according to one embodiment of the disclosure. The diffraction optical waveguide 100 includes a waveguide substrate 101, a coupling-in grating 102 and a coupling-out grating 103, which are specifically described as below:

the waveguide substrate 101 includes a coupling-in zone Z1 and a coupling-out zone Z2, and the coupling-in zone Z1 is spaced apart from the coupling-out zone Z2 by a preset distance. The waveguide substrate 101 has two outer surfaces and a thickness therebetween, and is configured to receive, at the coupling-in zone Z1, image light emitted by an image light source, and guide the image light towards the coupling-out zone Z2. The waveguide substrate 101 may be a thin sheet of an optical material transparent to visible light, such as glass, plastic or polymer. In some embodiments, the waveguide substrate 101 may be transparent to external light, and may be used in AR applications. The coupling-in zone Z1 is spaced apart from the coupling-out zone Z2 by a preset distance. In one specific embodiment, the coupling-in zone Z1 is disposed to correspond to the image light source, the coupling-out zone Z2 is disposed to correspond to the left and right eyes of a wearer, and a distance between a central point of the coupling-in zone Z1 and that of the coupling-out zone Z2 may be set according to a gap between the image light source and a middle point of the left and right eyes. In another specific embodiment, the coupling zone Z1 includes a first coupling-out zone and a second coupling-out zone, the first coupling-out zone and the second coupling-out zone used for corresponding to the left eye and the right eye of the wearer, respectively. A shape of the waveguide substrate 101 may be any suitable shape, for example, it may be rectangular, dumbbell-shaped or butterfly-shaped.

The coupling-in grating 102 is disposed in the coupling-in zone Z1 of the waveguide substrate 101 and configured to couple image light into the waveguide substrate 101 through diffraction. The coupling-in grating 102 may be a one-dimensional grating, for example, a straight-line grating, an oblique-tooth grating, a non-blazed grating or any other suitable type of grating; and the coupling-in grating 102 may also be a two-dimensional grating or a metasurface coupling-in structure. The coupling-in grating 102 may be an optical element including a periodic structure, which may be manufactured and obtained through any suitable micro-manufacturing process. For example, a grating may be made in the coupling-in zone Z1 of the waveguide substrate 101 by employing the photoetching technology, and a grating may also be made in the coupling-in zone Z1 by means of nanoimprint, thereby forming a surface relief diffraction grating. Among them, a one-dimensional grating (for example, a grating line) may be formed as a protrusion on a surface of the waveguide substrate 101, and a height of the protrusion may be reasonably set according to actual needs.

The coupling-out grating 103 is disposed in the coupling-out zone Z2 of the waveguide substrate 101 and configured to couple at least a part of diffracted light propagating thereinto out of the waveguide substrate 101 through diffraction. The coupling-out grating 103 may be a one-dimensional grating, for example, a straight-line grating, an oblique-tooth grating, a non-blazed grating or any other suitable type of grating; and the coupling-out grating 103 may also be a two-dimensional grating or a metasurface coupling-out structure. The coupling-out grating 103 may be an optical element including a periodic structure, which may be manufactured and obtained through any suitable micro-manufacturing process. For example, a grating may be made in the coupling-out zone Z2 of the waveguide substrate 101 by employing the photoetching technology, and a grating may also be made in the coupling-out zone Z2 by means of nanoimprint, thereby forming a surface relief diffraction grating. Among them, a one-dimensional grating (for example, a grating line) may be formed as a protrusion on a surface of the waveguide substrate 101, and a height of the protrusion may be reasonably set according to actual needs.

Figure 1B:
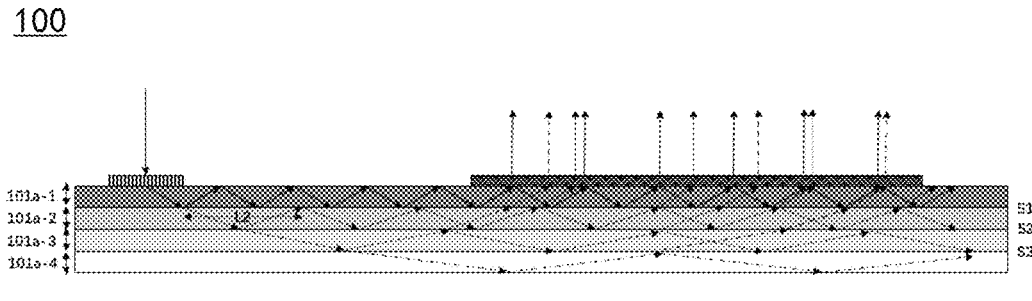

The waveguide substrate 101, the coupling-in grating 102 and the coupling-out grating 103 included in the diffraction optical waveguide 100 are introduced above, respectively. Among them, the waveguide substrate 101 further includes M layers of waveguide media 101a, where M is greater than or equal to 2 and is a positive integer. A catadioptric interface S is formed between adjacent waveguide media 101a. The diffracted light coupled-in from the coupling-in zone Z1 passes through the M layers of waveguide media 101a in sequence and is split by the catadioptric interface S. Beams after light splitting propagate towards the coupling-out zone Z2 along different transmission paths in the M layers of waveguide media 101a. Each layer of waveguide medium 101a has a different refractive index, wherein a refractive index of an $i^{th}$ layer of waveguide medium 101a is $n_i$, an air refractive index is $n_0$, and $|n_i - n_{i-1}| \geq 0.05$, such that the diffracted light coupled out of the waveguide substrate 101 has a preset energy distribution. The preset energy distribution is an expected energy distribution obtained according to design requirements. With reference to FIGS. 1A and 1B, the waveguide substrate 101, for example, includes M (=4) layers of waveguide media, i.e., a waveguide medium 101a-1, a waveguide medium 101a-2, a waveguide medium 101a-3, and a waveguide medium 101a-4, each layer of waveguide medium having a different refractive index. Formed between the waveguide medium 101a-1 and the waveguide medium 101a-2 is a catadioptric layer S1, formed between the waveguide medium 101a-2 and the waveguide medium 101a-3 is a catadioptric layer S2, and formed between the waveguide medium 101a-3 and the waveguide medium 101a-4 is a catadioptric layer S3. Image light passes through the coupling-in grating 102 to form diffracted light, the diffracted light is coupled into the waveguide medium 101a-1 from the coupling-in zone Z1 and is split by the catadioptric interface S1, and a part of a split light beam continues to propagate in the waveguide medium 101a-1, while the other part enters the waveguide medium 101a-2; a light beam entering the waveguide medium 101a-2 is split by the catadioptric interface S2, of which a part continues to propagate in the waveguide medium 101a-2, while the other part enters the waveguide medium 101a-3; a light beam entering the waveguide medium 101a-3 is split by the catadioptric interface S3, of which a part continues to propagate in the waveguide medium 101*a*-3, while the other part enters the waveguide medium 101*a*-4, is totally reflected when encountering an interface between the waveguide medium and air, and continues to propagate in the waveguide medium 101*a*-4. With continued reference to FIG. 1B, light beams propagate towards the coupling-out zone Z2 along different transmission paths in the four layers of waveguide media, and this will not be repeated here. Among them, the four layers of waveguide media have refractive indexes of $n_1$, $n_2$, $n_3$ and $n_4$, respectively, an absolute value of the difference between the refractive indexes of adjacent waveguide media is greater than or equal to 0.05, the transmission paths of the diffracted light in the four layers of waveguide media are independent from each other, and the diffracted light coupled out of the waveguide substrate 101 has a preset energy distribution. In some embodiments, the refractive index of a waveguide medium may be, for example, in a range of 1.4 to 2.0, and may also be higher. The material of a waveguide medium is, for example, lithium niobate (LiNbog), titanium dioxide (TiO), gallium nitride (GaN), aluminum nitride (AlN), silicon carbide (SiC), CVD diamond, and zinc sulfide (ZnS).

In conclusion, the disclosure provides a diffraction optical waveguide, wherein a waveguide substrate thereof has multiple layers of waveguide media, each layer of waveguide medium having a different refractive index; a catadioptric interface exists between adjacent waveguide media; diffracted light formed after image light passes through a coupling-in grating passes through different waveguide media, and is reflected and refracted at the catadioptric interface in a process of propagation towards a coupling-out grating; and different light beams pass through different propagation paths and carry different energies to different positions of the coupling-out grating, thereby being capable of regulating the energy distribution of the diffracted light on the grating surface when it reaches the coupling-out grating. Further introduction will be made below via preferred embodiments.

According to one preferred embodiment of the disclosure, the $i^{th}$ layer of waveguide medium has a thickness of $h_i$, $h_i \leq 1$ mm.

This embodiment provides a diffraction optical waveguide with high uniformity and a variable refractive index, wherein a waveguide substrate thereof is in a laminated structure and includes M layers of waveguide media, the refractive index of an $i^{th}$ layer of waveguide medium is $n_i$, $|n_i - n_{i-1}| \geq 0.05$, the $i^{th}$ layer of waveguide medium has a thickness of $h_i$, $h_i \leq 1$ mm. Since the refractive indexes of different layers are different, a catadioptric interface exists between the layers and may split the diffracted light, and beams after light splitting propagate in different waveguide media to form different transmission paths, distribution of the energy coupled out by the diffraction optical waveguide can be regulated by regulating $n_i$ and $h_i$.

According to one preferred embodiment of the disclosure, $|h_i - h_{i-1}| \geq 0.05$ mm.

This embodiment provides a diffraction optical waveguide with high uniformity and a variable refractive index, wherein a waveguide substrate thereof is in a laminated structure and includes M layers of waveguide media, the refractive index of an $i^{th}$ layer of waveguide medium is $n_i$, $|n_i - n_{i-1}| \geq 0.05$, the $i^{th}$ layer of waveguide medium has a thickness of $h_i$, $h_i \leq 1$ mm, and $|h_i - h_{i-1}| \geq 0.05$ mm. Since the refractive indexes of different layers are different, a catadioptric interface exists between the layers and may split the diffracted light, and beams after light splitting propagate in different waveguide media to form different transmission paths, distribution of the energy coupled out by the diffraction optical waveguide can be regulated by regulating $n_i$ and $h_i$.

According to one preferred embodiment of the disclosure, the image light is diffracted by the coupling-in grating, and a propagation direction of the diffracted light in a first layer of waveguide medium satisfies the following formulae:

$$n_1 \sin \theta_1 \sin\varphi_1 = n_0 \sin \theta_0 \sin\varphi_0$$

$$n_1 \sin \theta_1 \cos\varphi_1 - n_0 \sin \theta_0 \cos\varphi_0 = \frac{\lambda}{d}$$

where $\lambda$ is a wavelength of the image light, d is a period of the coupling-in grating, $\theta_0$ is an incident angle when the image light is incident to the coupling-in grating, $\varphi_0$ is an azimuthal angle when the image light is incident to the coupling-in grating, $\theta_1$ is a diffraction angle of +1-order diffracted light in the first layer of waveguide medium, and $\varphi_1$ is an azimuthal angle of the +1-order diffracted light in the first layer of waveguide medium.

In this embodiment, the image light is diffracted by the coupling-in grating, and a propagation direction of the diffracted light in the first layer is calculated through the diffraction formulae described above. The diffracted light continues to propagate along different transmission paths in other layers of waveguide media, of which a part reaches the coupling-out grating, then is diffracted by the coupling-out grating to be out of the diffraction optical waveguide, and is focused by the eyes of a wearer so as to form an image.

According to one aspect of the disclosure, the image light is diffracted by the coupling-in grating, the diffracted light is reflected and/or refracted by the catadioptric layer, and a light propagation direction satisfies:

$$n_i \sin \theta_i = n_0 \sin \theta_{i-1} \ (i \geq 2)$$

when the diffracted light propagates in the $i^{th}$ layer of waveguide medium, a gap $L_i$ between adjacent reflection positions satisfies the following formula:

$$L_i = 2h_i \tan \theta_i$$

where $h_i$ is a thickness of the $i^{th}$ layer of waveguide medium, and $\theta_i$ is an angle of the +1-order diffracted light in the $i^{th}$ layer of waveguide medium.

In this embodiment, the diffraction optical waveguide is in a laminated structure, that is, the waveguide substrate includes multiple layers of waveguide media, and different layers of waveguide media have different refractive indexes and different thicknesses. A catadioptric interface exists between adjacent waveguide media. Diffracted light formed after image light passes through the coupling-in grating passes through different waveguide media in the process of propagating towards the coupling-out grating, and is reflected and refracted at the catadioptric interface, that is, a propagation direction of the diffracted light in another waveguide medium after its passage through the first layer of waveguide medium satisfies the formulae described above. With reference to FIG. 1B, when the diffracted light transmits in the second layer of waveguide medium, a light propagation direction satisfies $n_2 \sin \theta_2 = n_0 \sin \theta_1$, and a gap between adjacent reflection positions on one and the same interface satisfies $L_2 = 2h_2 \tan \theta_2$, where $h_2$ is a thickness of the second layer of waveguide medium, and $\theta_2$ is an angle of the +1-order diffracted light in the second layer of waveguide medium.

According to one preferred embodiment of the disclosure, the coupling-in zone and the coupling-out zone are located at a surface of the waveguide substrate.

With continued reference to FIG. 1A, the waveguide substrate 101 may have a first surface and a second surface that are substantially flat. Among them, the first surface and the second surface are opposite to each other. In one specific embodiment, the first surface may refer to a surface of a near-eye display device having the waveguide substrate 101 towards a side of a wearer's eyes, and the second surface be a surface away from the side of the wearer's eyes. Diffracted light formed by image light entering the waveguide substrate 101 via the coupling-in grating may propagate in a direction generally parallel to the first surface and the second surface. A thickness of each layer of waveguide medium 101a in the waveguide substrate 101 may refer to a dimension in a direction generally perpendicular to the first surface and the second surface. The coupling-in zone Z1 is disposed on the first surface or the second surface of the waveguide substrate 101, the coupling-out zone Z2 is disposed on the first surface or the second surface of the waveguide substrate 101, and the coupling-in zone may be located on the same side or a different side of the waveguide substrate 101.

According to one preferred embodiment of the disclosure, the coupling-in grating is a circular grating, and has a coupling-in diameter of m, $m \leq 5$ mm.

With continued reference to FIG. 1A, the coupling-in grating 102 is a circular grating, and a shape of the coupling-in zone Z1 may be a circle sized to be close to or slightly larger than that of the circular grating. In one embodiment, the coupling-in grating 102 may have a diameter of 2 mm to 5 mm. In another embodiment, the circular design may match the size of the lens in an optical machine.

According to one preferred embodiment of the disclosure, the coupling-out grating includes a plurality of partition gratings, and adjustment is made to one or more of the following: the number of partition gratings, structural depths of the partition gratings, structural types of the partition gratings, and the refractive index and thickness of the $i^{th}$ layer of waveguide medium, so as to improve coupling-out efficiency and/or uniformity of the diffraction optical waveguide.

Figure 2A:
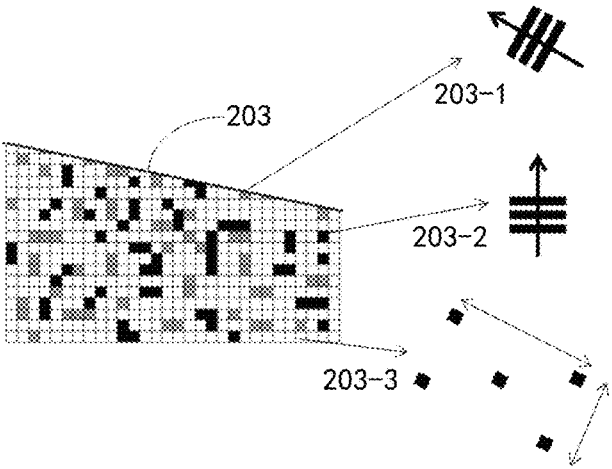
FIGS. 2A and 2B illustrate schematic diagrams of partitioning of a coupling-out grating according to several embodiments of the disclosure.

In order to improve the efficiency and coupling-out uniformity of the diffraction optical waveguide, in some embodiments, as shown in FIG. 2A, the coupling-out grating 203 includes a plurality of partition gratings, and each partition grating may be a one-dimensional grating or a two-dimensional grating, that is, the coupling-out grating 203 may be a combined grating of a one-dimensional grating and a two-dimensional grating. The plurality of partition gratings are arranged regularly. For example, each partition grating may be a rectangle of the same size, or another suitable shape of the same size. When the structural type of a partition grating is a one-dimensional grating, different partition gratings may be formed of one-dimensional gratings with different grating vectors, respectively. For example, a partition grating 203-1 is a first kind of one-dimensional grating with a grating vector in a direction as indicated by the arrow, and a partition grating 203-2 is a second kind of one-dimensional grating with a grating vector in a direction as indicated by the arrow. A partition grating 203-3 shows the case of a two-dimensional grating.

Figure 2B:
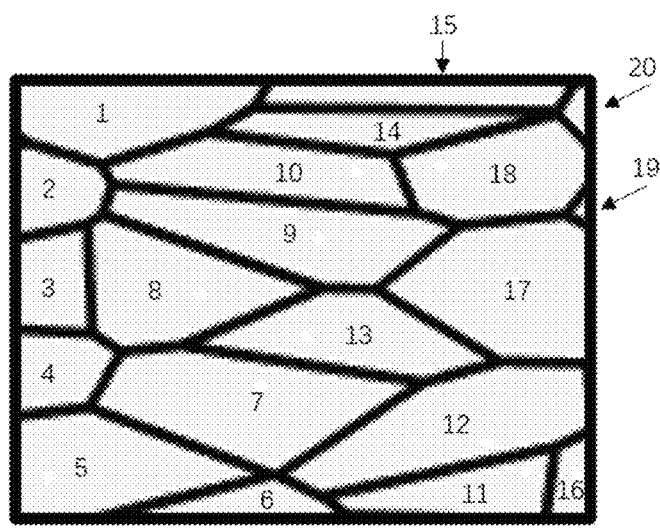

In other embodiments, as shown in FIG. 2B, the coupling-out grating includes 20 partition gratings, and each partition grating may be a one-dimensional grating or a two-dimensional grating. The 20 partition gratings are arranged irregularly and have different sizes and shapes. When the structural type of a partition grating is a one-dimensional grating, different partition gratings may be formed of one-dimensional gratings with different grating vectors, respectively.

The structural type of a partition grating is, for example, a one-dimensional grating or a two-dimensional grating. The one-dimensional grating may include a plurality of periodic structures. For example, a one-dimensional grating may be formed of a plurality of grating lines, and each grating line may be formed by continuously connecting a plurality of periodic structures. And the two-dimensional grating may include a plurality of two-dimensional periodic structures, and the shape of a two-dimensional periodic structure for the two-dimensional grating may be a polygon, for example, a quadrangle, a pentagon, a hexagon, or another polygon, which may also be a triangle or a Reuleaux triangle.

In some embodiments of the disclosure, the waveguide with a variable refractive index as a macrostructure is combined with the partitioned grating as a microstructure to jointly modulate the coupling-out efficiency and uniformity of the waveguide. Specifically, the coupling-out grating is composed of a plurality of partition gratings, the number of partitions being j (j is greater than or equal to 1 and is a positive integer), a structural depth of each partition grating being $M_j$, and a structural type thereof being $P_j$, such that the coupling-out efficiency and uniformity of the diffraction optical waveguide can be optimized jointly by adjusting j, $M_j$, $P_j$, and the structural parameters $n_i$ and $h_i$ of the layered waveguide media.

According to one preferred embodiment of the disclosure, the coupling-in grating and the coupling-out grating are surface relief gratings or volume hologram gratings.

According to one preferred embodiment of the disclosure, the M layers of waveguide media are integrally formed by means of bonding.

In some embodiments, the waveguide substrate is composed of multiple layers of waveguide media, which are integrally formed by means of high-temperature bonding.

The diffraction optical waveguides designed according to the disclosure are introduced above in several preferred embodiments. The waveguide with the high uniformity, high luminance and variable refractive index as provided in the disclosure changes an energy distribution of the light incident onto the coupling-out grating, which, in combination with the coupling-out grating, can improve the coupling-out efficiency and uniformity of the diffraction optical waveguide. As compared with the existing waveguides, the disclosure achieves a higher degree of freedom in regulation of the efficiency and uniformity of the waveguide by combining a waveguide macrostructure, i.e., a layered waveguide substrate with a variable refractive index, with a microstructure, i.e., a coupling-out grating. The technical effects will be further described below in the embodiments.

Embodiment 1

Figure 3A:
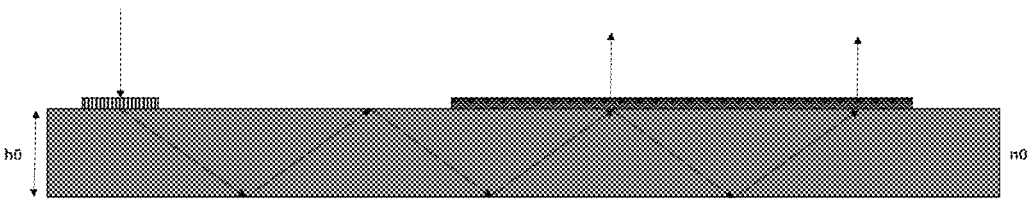
FIGS. 3A and 3B illustrate schematic diagrams of a diffraction optical waveguide structure and a full-field simulation result where the invention is not adopted.
Figure 3B:
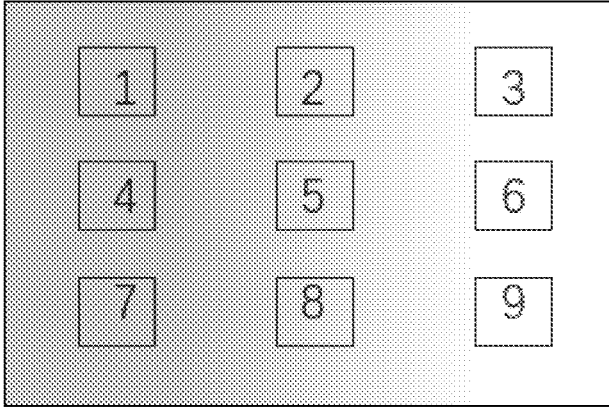

FIGS. 3A and 3B illustrate schematic diagrams of a diffraction optical waveguide structure and a full-field simulation result where the invention is not adopted. Among them, FIG. 3A is a structural schematic diagram of a diffraction optical waveguide, wherein a waveguide thickness is $h_0=1$ mm, and a waveguide refractive index is $n_0=1.8$. FIG. 3B is a simulation result of a full field at the center of a coupling-out end of the diffraction optical waveguide, and the luminance uniformity thereof is U1=min(L1, L2 . . . L9)/max(L1, L2 . . . L9)=61%, where L represents a luminance mean value of 100 pixel zones of a corresponding visual field. If 9-point luminance is adopted as a reference for consideration, its luminance is $$E1 = \sum_{k=1}^{9} Li/9 = 160 \ nit/\text{lm}.$$

Figure 4A:
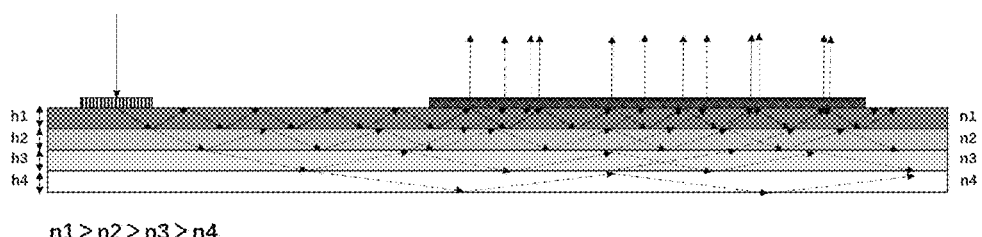
FIGS. 4A and 4B illustrate schematic diagrams of a diffraction optical waveguide structure and a full-field simulation result where the invention is adopted.
Figure 4B:
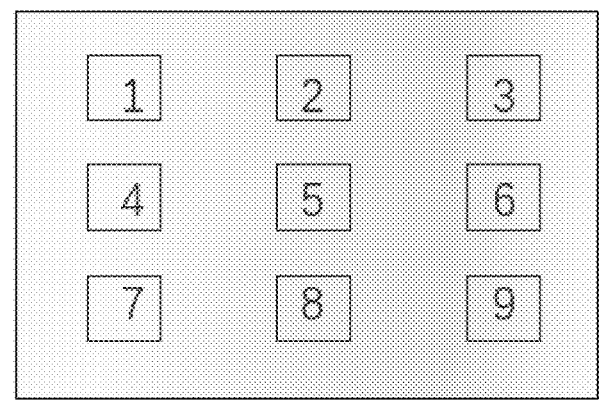

FIGS. 4A and 4B illustrate schematic diagrams of a diffraction optical waveguide structure and a full-field simulation result where the invention is adopted. Among them, FIG. 4A is a structural schematic diagram of a diffraction optical waveguide with four layers of waveguide media, wherein each layer of waveguide medium has a thickness of $h_1=h_2=h_3=h_4=1$ mm in sequence, each layer of waveguide medium has a refractive index of $n_1=1.9$, $n_2=1.8$, $n_3=1.7$, $n_4=1.5$ in sequence, $n_1>n_2>n_3>n_4$, and a refractive index difference between adjacent waveguide media is >0.05.

FIG. 4B is a simulation result of a full field at the center of a coupling-out end of the diffraction optical waveguide, and the luminance uniformity thereof is U2=min(L1, L2 . . . L9)/max(L1, L2 . . . L9)=75%, where L represents a luminance mean value of 100 pixel zones of a corresponding visual field. If 9-point luminance is adopted as a reference for consideration, its luminance is $$E2 = \sum_{k=1}^{9} Li/9 = 185 \ nit/\text{lm}.$$

As can be found from this, the luminance uniformity is improved from 61% to 75%, and the luminance is improved from 160 nit/lm to 185 nit/lm after the design of the invention is adopted.

Embodiment 2

Figure 5A:
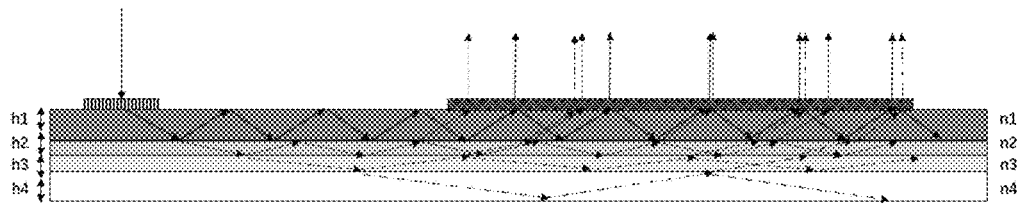
FIGS. 5A and 5B illustrate schematic diagrams of another diffraction optical waveguide structure and a full-field simulation result where the invention is adopted.
Figure 5B:
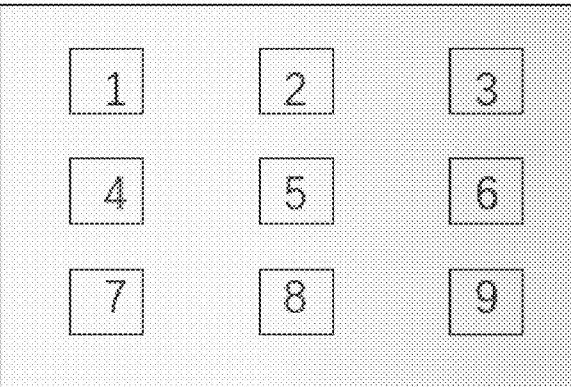

FIGS. 5A and 5B illustrate schematic diagrams of another diffraction optical waveguide structure and a full-field simulation result where the invention is adopted, and differs from FIGS. 4A and 4B in that the thicknesses of the four layers of waveguide media are not all the same. The details are as follows:

FIG. 5A is a structural schematic diagram of a diffraction optical waveguide with four layers of waveguide media, wherein each layer of waveguide medium has a thickness of $h_1=0.3$ mm, $h_2=0.2$ mm, $h_3=0.2$ mm, and $h_4=0.3$ mm in sequence, and each layer of waveguide medium has a refractive index of $n_1=1.9$, $n_2=1.8$, $n_3=1.7$, and $n_4=1.5$ in sequence, $n_1>n_2>n_3>n_4$, and a refractive index difference between adjacent waveguide media is >0.05.

FIG. 5B is a simulation result of a full field at the center of a coupling-out end of the diffraction optical waveguide, and the luminance uniformity thereof is U2=min(L1, L2 . . . L9)/max(L1, L2 . . . L9)=80%, where L represents a luminance mean value of 100 pixel zones of a corresponding visual field. If 9-point luminance is adopted as a reference for consideration, its luminance $$E2 = \sum_{k=1}^{9} Li/9 = 212 \ nit/\text{lm}.$$

As can be found from above, as compared with the design in FIGS. 3A and 3B where the invention is not adopted, the luminance uniformity of the light coupled out of the diffraction optical waveguide is improved from 61% to 80%, and the luminance is improved from 160 nit/lm to 212 nit/lm. As compared with the diffraction optical waveguide in FIGS. 4A and 4B where the waveguide media with the same thickness are adopted, the luminance uniformity of the light coupled out of the diffraction optical waveguide is further improved from 75% to 80%, and the luminance is further improved from 185 nit/lm to 212 nit/lm.

Embodiment 3

Embodiment 3 differs from Embodiment 2 in that slight adjustment is made to the refractive indexes of three layers of waveguide media thereof. The details are as follows:

A diffraction optical waveguide includes four layers of waveguide media, wherein each layer of waveguide medium has a thickness of $h_1=0.3$ mm, $h_2=0.2$ mm, $h_3=0.2$ mm, and $h_4=0.3$ mm in sequence, each layer of waveguide medium has a refractive index of $n_1=1.9$, $n_2=1.7$, $n_3=1.82$, and $n_4=1.65$ in sequence, and a refractive index difference between adjacent waveguide media is >0.05.

In the result obtained by simulating a full field at the center of a coupling-out end of the diffraction optical waveguide, the luminance uniformity is U2=min(L1, L2 . . . L9)/max(L1, L2 . . . L9)=84%. If 9-point luminance is adopted as a reference for consideration, its luminance is $$E2 = \sum_{k=1}^{9} Li/9 = 260 \ nit/\text{lm}.$$

As can be found from above, as compared with the design in FIGS. 3A and 3B where the invention is not adopted, the luminance uniformity of the light coupled out of the diffraction optical waveguide is improved from 61% to 84%, and the luminance is improved from 160 nit/lm to 260 nit/lm. As compared with the diffraction optical waveguide in Embodiment 2, the luminance uniformity of the light coupled out of the diffraction optical waveguide is further improved from 80% to 84%, and the luminance is further improved from 212 nit/lm to 260 nit/lm.

Embodiment 4

FIGS. 6A and 6B illustrate schematic diagrams of another diffraction optical waveguide structure and a full-field simulation result where the invention is adopted. Embodiment 4 differs from Embodiment 2 in that the coupling-out grating is formed by combining 20 partition gratings. The details are as follows:

FIG. 6A is a structural schematic diagram of a diffraction optical waveguide with four layers of waveguide media, wherein each layer of waveguide medium has a thickness of $h_1=0.3$ mm, $h_2=0.2$ mm, $h_3=0.2$ mm, and $h_4=0.3$ mm in sequence, each layer of waveguide medium has a refractive index of $n_1=1.9$, $n_2=1.8$, $n_3=1.7$, and $n_4=1.5$ in sequence, $n_1>n_2>n_3>n_4$, and a refractive index difference between adjacent waveguide media is >0.05.

FIG. 6B illustrates a simulation result of a full field at the center of a coupling-out end of the diffraction optical waveguide, and the luminance uniformity thereof is U2=min(L1, L2 . . . L9)/max(L1, L2 . . . L9)=92%. If 9-point luminance is adopted as a reference for consideration, its luminance is $$E2 = \sum_{k=1}^{9} Li/9 = 325 \ nit/\text{lm}.$$

As can be found from above, as compared with the design in FIGS. 3A and 3B where the invention is not adopted, the luminance uniformity of the light coupled out of the diffraction optical waveguide is improved from 61% to 92%, and the luminance is improved from 160 nit/lm to 325 nit/lm. As compared with Embodiment 2, the luminance uniformity of the light coupled out of the diffraction optical waveguide is further improved from 80% to 92%, and the luminance is further improved from 212 nit/lm to 325 nit/lm.

As can be known from Embodiment 1 to Embodiment 4, the invention achieves better efficiency as compared with the existing waveguides, a higher degree of freedom in regulation of the waveguide uniformity, and a simple preparation process by combining a waveguide macrostructure, i.e., a layered waveguide with a variable refractive index, with a grating microstructure, i.e., a partitioned coupling-out grating.

The disclosure further provides a near-eye display device, including:

an optical machine configured to output image light; and a diffraction optical waveguide as described above, including a coupling-in grating and a coupling-out grating, the image light output by the optical machine entering the diffraction optical waveguide via the coupling-in grating, split into a plurality of beams in the diffraction optical waveguide and coupled out via the coupling-out grating along different transmission paths.

In some embodiments, the near-eye display device is an Augmented Reality display device or a Virtual Reality display device, wherein the Augmented Reality display device includes, but is not limited to, Augmented Reality (AR) glasses, a vehicle-mounted head-up display (HUD), and the like.

The optical machine may project image light towards the diffraction optical waveguide, for example, towards a zone where the coupling-in grating of the diffraction optical waveguide is located, wherein the optical machine may be a laser beam scanner (LBS), a digital light processor (DLP), a digital micro-mirror device (DMD), a liquid crystal on silicon (LCOS), a micro electro mechanical system (MEMS), an organic light emitting diode (OLED), a MicroLED optical machine, or any other micro display, and a light beam emitted by the optical machine is visible light.

The disclosure further provides a design method of a diffraction optical waveguide as described above, as shown in FIG. 7, including:

Step S11: setting one or more of the following in the diffraction optical waveguide: the number M of layers of waveguide media, a refractive index $n_i$ of an $i^{th}$ layer of waveguide medium, a thickness $h_i$ of the $i^{th}$ layer of waveguide medium, the number of partition gratings in the coupling-out grating, structural depths of the partition gratings and structural types of the partition gratings;

Step S12: obtaining, through simulation, coupling-out efficiency and uniformity of the diffraction optical waveguide.

Figure 8:
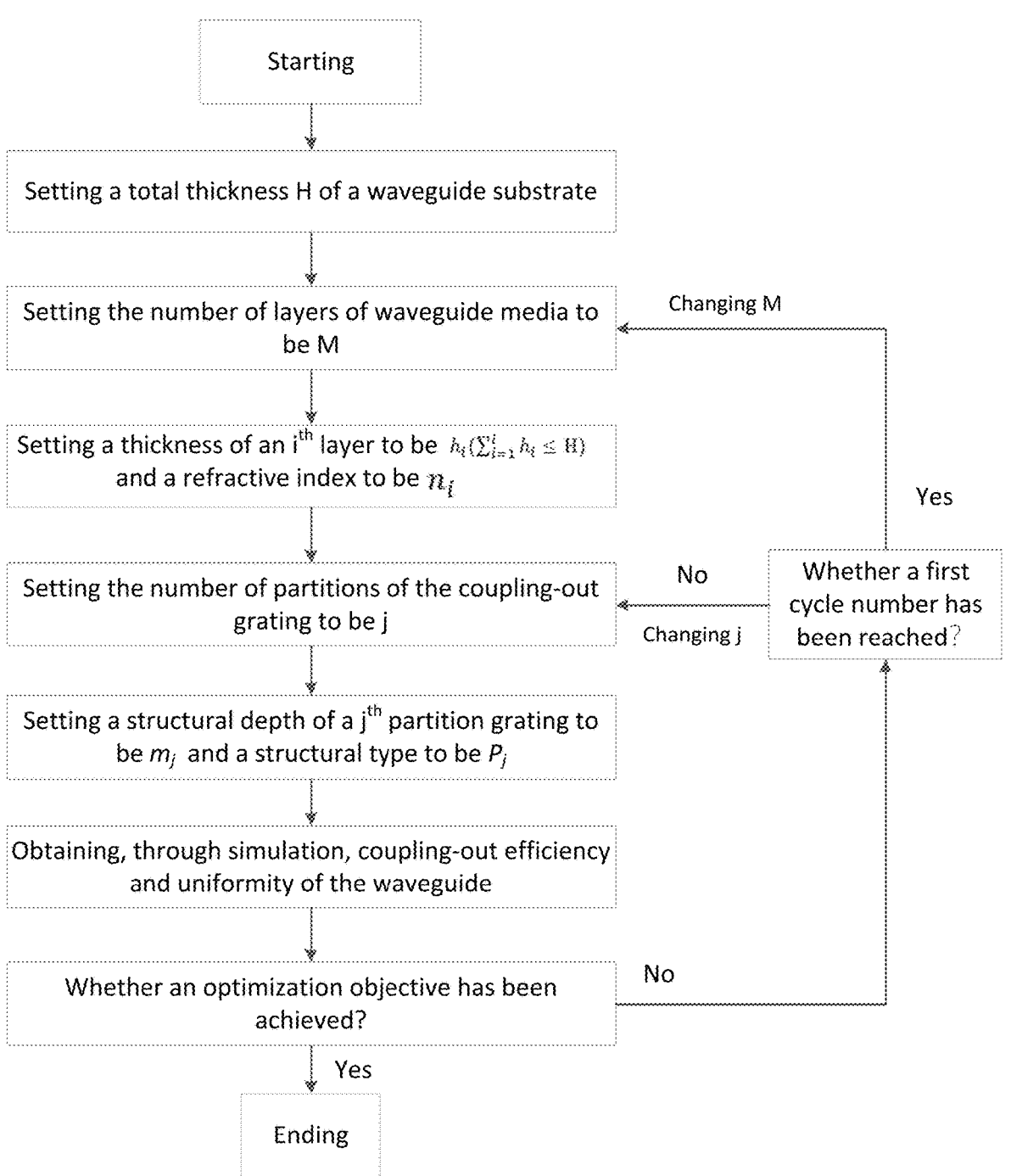
FIG. 8 illustrates a flowchart of a design method according to another embodiment of the disclosure.

FIG. 8 illustrates a flowchart of a design method according to one embodiment of the disclosure. During simulation design, firstly a total thickness H of a waveguide substrate is set, then the number M of layers of waveguide media in a waveguide substrate is set, and subsequently a thickness and refractive index of each layer of waveguide medium are set in sequence. If a waveguide with a variable refractive index is used only, the coupling-out efficiency and uniformity of the waveguide are obtained directly through simulation. If a solution concerning a waveguide with a variable refractive index and a partitioned coupling-out grating is adopted, the number j of partitions of the coupling-out grating and a structural depth and structural type of each partition grating are set sequentially, and the coupling-out efficiency and uniformity of the waveguide are obtained through simulation finally. If an optimization objective is not met, the parameter settings in the process may also be adjusted.

In conclusion, according to the disclosure, a waveguide macrostructure, i.e., a layered waveguide with a variable refractive index, is combined with a grating microstructure, i.e., a partitioned coupling-out grating, so as to have better efficiency as compared with the existing waveguides, a higher degree of freedom in regulation of the waveguide uniformity, and a simple preparation process.

Article 1: a diffraction optical waveguide, comprising:

a waveguide substrate comprising a coupling-in zone and a coupling-out zone, the coupling-in zone spaced apart from the coupling-out zone by a preset distance;

a coupling-in grating disposed in the coupling-in zone of the waveguide substrate and configured to couple image light into the waveguide substrate through diffraction; and a coupling-out grating disposed in the coupling-out zone of the waveguide substrate and configured to couple at least a part of diffracted light propagating thereinto out of the waveguide substrate through diffraction, wherein the waveguide substrate comprises M layers of waveguide media, where M≥2, the refractive indexes of the M layers of waveguide media are configured with a non-sequential distribution, a catadioptric interface is formed between adjacent waveguide media, the diffracted light coupled-in from the coupling-in zone passes through the M layers of waveguide media in sequence and is split by the catadioptric interface, beams after light splitting propagate towards the coupling-out zone along different transmission paths in the M layers of waveguide media, and each layer of waveguide medium has a different refractive index, wherein a refractive index of an $i^{th}$ layer of waveguide medium is $n_i$, an air refractive index is $n_0$, and $|n_i - n_{i-1}| \geq 0.05$, such that the diffracted light coupled out of the waveguide substrate has a preset energy distribution.

Article 2: The diffraction optical waveguide according to Article 1, wherein the $i^{th}$ layer of waveguide medium has a thickness of $h_i$, $h_i \leq 1$ mm.

Article 3: The diffraction optical waveguide according to Article 2, wherein $|h_i - h_{i-1}| \, 0.05$ mm.

Article 4: The diffraction optical waveguide according to Article 1, wherein the coupling-in zone and the coupling-out zone are located at a surface of the waveguide substrate.

Article 5: The diffraction optical waveguide according to Article 4, wherein the image light is diffracted by the coupling-in grating, and a propagation direction of the diffracted light in a first layer of waveguide medium satisfies the following formulae:

$$n_1 \sin \theta_1 \sin\varphi_1 = n_0 \sin \theta_0 \sin\varphi_0$$

$$n_1 \sin \theta_1 \cos\varphi_1 - n_0 \sin \theta_0 \cos\varphi_0 = \frac{\lambda}{d}$$

where $\lambda$ is a wavelength of the image light, d is a period of the coupling-in grating, $\theta_0$ is an incident angle when the image light is incident to the coupling-in grating, $\varphi_0$ is an azimuthal angle when the image light is incident to the coupling-in grating, $\theta_1$ is a diffraction angle of +1-order diffracted light in the first layer of waveguide medium, and $\varphi_1$ is an azimuthal angle of the +1-order diffracted light in the first layer of waveguide medium.

Article 6: The diffraction optical waveguide according to Article 4, wherein the image light is diffracted by the coupling-in grating, the diffracted light is reflected and/or refracted by the catadioptric layer, and a light propagation direction satisfies:

$$n_i \sin \theta_i = n_0 \sin \theta_{i-1} \ (i \geq 2)$$

when the diffracted light propagates in the $i^{th}$ layer of waveguide medium, a gap $L_i$ between adjacent reflection positions satisfies the following formula:

$$L_i = 2h_i \tan \theta_i$$

where $h_i$ is a thickness of the $i^{th}$ layer of waveguide medium, and $\theta_i$ is an angle of the +1-order diffracted light in the $i^{th}$ layer of waveguide medium.

Article 7: The diffraction optical waveguide according to any one of Articles 1-6, wherein the coupling-in grating is a circular grating, and has a coupling-in diameter of m, m≤5 mm.

Article 8: The diffraction optical waveguide according to any one of Articles 1-6, wherein the coupling-out grating comprises a plurality of partition gratings, and adjustment is made to one or more of the following: a number of partition gratings, structural depths of the partition gratings, structural types of the partition gratings, and the refractive index and thickness of the $i^{th}$ layer of waveguide medium, so as to improve coupling-out efficiency and/or uniformity of the diffraction optical waveguide.

Article 9: The diffraction optical waveguide according to any one of Articles 1-6, wherein the coupling-in grating and the coupling-out grating are surface relief gratings or volume hologram gratings.

Article 10: The diffraction optical waveguide according to any one of Articles 1-6, wherein the M layers of waveguide media are integrally formed by means of bonding.

Article 11: A near-eye display device, comprising:
an optical machine configured to output image light; and
a diffraction optical waveguide as defined in any one of Articles 1-10, comprising a coupling-in grating and a coupling-out grating, the image light output by the optical machine entering the diffraction optical waveguide via the coupling-in grating, split into a plurality of beams in the diffraction optical waveguide and coupled out via the coupling-out grating along different transmission paths.

Article 12: The diffraction optical waveguide according to Article 11, wherein the near-eye display device is an Augmented Reality display device or a Virtual Reality display device.

Article 13: A design method of a diffraction optical waveguide as defined in any one of claims 1-10, comprising:

S11: setting one or more of the following in the diffraction optical waveguide: a number M of layers of waveguide media, a refractive index $n_i$ of an $i^{th}$ layer of waveguide medium, a thickness $h_i$ of the $i^{th}$ layer of waveguide medium, a number of partition gratings in the coupling-out grating, structural depths of the partition gratings and structural types of the partition gratings;

S12: obtaining, through simulation, coupling-out efficiency and uniformity of the diffraction optical waveguide.

It should be noted finally that the contents described above are only preferred embodiments of the present disclosure, and are not used to limit the present disclosure. Although the detailed description of the present disclosure has been provided with reference to the foregoing embodiments, those skilled in the art may still make modifications to the technical solution as recited in each of the foregoing embodiments, or make equivalent replacements for some of the technical features therein. Any modification, equivalent replacement, or improvement, etc., made within the spirit and principles of the present disclosure, should be included in the protection scope of the present disclosure.

We claim:
1. A diffraction optical waveguide, comprising:
a waveguide substrate comprising a coupling-in zone and a coupling-out zone, the coupling-in zone spaced apart from the coupling-out zone by a preset distance;
a coupling-in grating disposed in the coupling-in zone of the waveguide substrate and configured to couple image light into the waveguide substrate through diffraction; and
a coupling-out grating disposed in the coupling-out zone of the waveguide substrate and configured to couple at least a part of the diffracted light propagating thereinto out of the waveguide substrate through diffraction,
wherein the waveguide substrate comprises 4 layers of waveguide media, a catadioptric interface is formed between adjacent waveguide media, the diffracted light coupled-in from the coupling-in zone passes through the 4 layers of waveguide media in sequence and is split by the catadioptric interface, beams after light splitting propagate towards the coupling-out zone along different transmission paths in the 4 layers of waveguide media, and each layer of waveguide medium has a different refractive index, wherein a refractive index of an $i^{th}$ layer of waveguide medium is $n_i$, an air refractive index is $n_0$, and $|n_i - n_i| \geq 0.05$, such that the diffracted light coupled out of the waveguide substrate has a preset energy distribution, wherein refractive indexes of the 4 layers of waveguide media satisfy:

$$n_1 - n_2 > 0.05, \ n_3 - n_2 > 0.05, \ n_3 - n_4 > 0.05, \text{ and}$$

wherein the image light is diffracted by the coupling-in grating, and a propagation direction of the diffracted light in a first layer of waveguide medium satisfies the following formulae:

$$n_1 \sin \theta_1 \sin \varphi_1 = n_0 \sin \theta_0 \sin \varphi_0$$

$$n_1 \sin \theta_1 \cos \varphi_1 - n_0 \sin \theta_0 \cos \varphi_0 = \frac{\lambda}{d}$$

where $\lambda$ is a wavelength of the image light, d is a period of the coupling-in grating, $\theta_0$ is an incident angle when the image light is incident to the coupling-in grating, $\varphi_0$ is an azimuthal angle when the image light is incident to the coupling-in grating, $\theta_1$ is a diffraction angle of +1-order diffracted light in the first layer of waveguide medium, and $\varphi_1$ is an azimuthal angle of the +1-order diffracted light in the first layer of waveguide medium.

2. The diffraction optical waveguide according to claim 1, wherein the $i^{th}$ layer of waveguide medium has a thickness of $h_i$, $h_i \leq 1$ mm.

3. The diffraction optical waveguide according to claim 2, wherein $|h_i - h_{i-1}| \geq 0.05$ mm.

4. The diffraction optical waveguide according to claim 1, wherein the coupling-in zone and the coupling-out zone are located at a surface of the waveguide substrate.

5. The diffraction optical waveguide according to claim 4, wherein the diffracted light is reflected and/or refracted by the catadioptric layer, and a light propagation direction satisfies:

$$n_i \sin \theta_i = n_0 \sin \theta_{i-1} \ (i \geq 2)$$

when the diffracted light propagates in the $i^{th}$ layer of waveguide medium, a gap $L_i$ between adjacent reflection positions satisfies the following formula:

$$L_i = 2h_i \tan \theta_i$$

where $h_i$ is a thickness of the $i^{th}$ layer of waveguide medium, and $\theta_i$ is an angle of the +1-order diffracted light in the $i^{th}$ layer of waveguide medium.

6. The diffraction optical waveguide according to claim 1, wherein the coupling-in grating is a circular grating, and has a coupling-in diameter of m, m$\leq$5 mm.

7. The diffraction optical waveguide according to claim 1, wherein the coupling-out grating comprises a plurality of partition gratings, and adjustment is made to one or more of the following: a number of partition gratings, structural depths of the partition gratings, structural types of the partition gratings, and the refractive index and thickness of the $i^{th}$ layer of waveguide medium, so as to improve coupling-out efficiency and/or uniformity of the diffraction optical waveguide.

8. The diffraction optical waveguide according to claim 1, wherein the coupling-in grating and the coupling-out grating are surface relief gratings or volume hologram gratings.

9. The diffraction optical waveguide according to claim 1, wherein the 4 layers of waveguide media are integrally formed by means of bonding.

10. A design method of a diffraction optical waveguide as defined in claim 1, comprising:

setting one or more of the following in the diffraction optical waveguide: a number 4 of layers of waveguide media, a refractive index $n_i$ of an $i^{th}$ layer of waveguide medium, a thickness $h_i$ of the $i^{th}$ layer of waveguide medium, a number of partition gratings in the coupling-out grating, structural depths of the partition gratings and structural types of the partition gratings;

obtaining, through simulation, coupling-out efficiency and uniformity of the diffraction optical waveguide.

11. A near-eye display device, comprising:

an optical machine configured to output image light; and a diffraction optical waveguide, comprising:

a waveguide substrate comprising a coupling-in zone and a coupling-out zone, the coupling-in zone spaced apart from the coupling-out zone by a preset distance;

a coupling-in grating disposed in the coupling-in zone of the waveguide substrate and configured to couple the image light into the waveguide substrate through diffraction; and a coupling-out grating disposed in the coupling-out zone of the waveguide substrate and configured to couple at least a part of the diffracted light propagating thereinto out of the waveguide substrate through diffraction, wherein the waveguide substrate comprises 4 layers of waveguide media, a catadioptric interface is formed between adjacent waveguide media, the diffracted light coupled-in from the coupling-in zone passes through the 4 layers of waveguide media in sequence and is split by the catadioptric interface, beams after light splitting propagate towards the coupling-out zone along different transmission paths in the 4 layers of waveguide media, and each layer of waveguide medium has a different refractive index, wherein a refractive index of an $i^{th}$ layer of waveguide medium is $n_i$, an air refractive index is no, and $|n_i - n_{i-1}| \geq 0.05$, such that the diffracted light coupled out of the waveguide substrate has a preset energy distribution, wherein refractive indexes of the 4 layers of waveguide media satisfy:

$$n_1 - n_2 > 0.05, \ n_3 - n_2 > 0.05, \ n_3 - n_4 > 0.05, \ \text{and}$$

wherein the image light is diffracted by the coupling-in grating, and a propagation direction of the diffracted light in a first layer of waveguide medium satisfies the following formulae:

$$n_1 \sin \theta_1 \sin\varphi_1 = n_0 \sin \theta_0 \sin\varphi_0$$

$$n_1 \sin \theta_1 \cos\varphi_1 - n_0 \sin \theta_0 \cos\varphi_0 = \frac{\lambda}{d}$$

where $\lambda$ is a wavelength of the image light, d is a period of the coupling-in grating, $\theta_0$ is an incident angle when the image light is incident to the coupling-in grating, $\varphi_0$ is an azimuthal angle when the image light is incident to the coupling-in grating, $\theta_1$ is a diffraction angle of +1-order diffracted light in the first layer of waveguide medium, and $\varphi_1$ is an azimuthal angle of the +1-order diffracted light in the first layer of waveguide medium, and wherein the image light output by the optical machine enters the diffraction optical waveguide via the coupling-in grating, is split into a plurality of beams in the diffraction optical waveguide and coupled out via the coupling-out grating along the different transmission paths.

12. The near-eye display device according to claim 11, wherein the near-eye display device is an Augmented Reality display device or a Virtual Reality display device.

13. The near-eye display device according to claim 11, wherein the $i^{th}$ layer of waveguide medium has a thickness of $h_i$, $h_i \leq 1$ mm, and wherein $|h_i - h_{i-1}| \geq 0.05$ mm.

14. The near-eye display device according to claim 11, wherein the coupling-in zone and the coupling-out zone are located at a surface of the waveguide substrate, and wherein the diffracted light is reflected and/or refracted by the catadioptric layer, and a light propagation direction satisfies:

$$n_i \sin \theta_i = n_0 \sin \theta_{i-1} \ (i \geq 2)$$

when the diffracted light propagates in the $i^{th}$ layer of waveguide medium, a gap $L_i$ between adjacent reflection positions satisfies the following formula:

$$L_i = 2h_i \tan \theta_i$$

where $h_i$ is a thickness of the $i^{th}$ layer of waveguide medium, and $\theta_i$ is an angle of the +1-order diffracted light in the $i^{th}$ layer of waveguide medium.

15. The near-eye display device according to claim 11, wherein the coupling-in grating is a circular grating, and has a coupling-in diameter of m, m$\leq$5 mm.

16. The near-eye display device according to claim 11, wherein the coupling-out grating comprises a plurality of partition gratings, and adjustment is made to one or more of the following: a number of partition gratings, structural depths of the partition gratings, structural types of the partition gratings, and the refractive index and thickness of the $i^{th}$ layer of waveguide medium, so as to improve coupling-out efficiency and/or uniformity of the diffraction optical waveguide.

17. The near-eye display device according to claim 11, wherein the coupling-in grating and the coupling-out grating are surface relief gratings or volume hologram gratings.

18. The near-eye display device according to claim 11, wherein the 4 layers of waveguide media are integrally formed by means of bonding.

* * * * *